United States Patent
Johansson

Patent Number: 5,839,863
Date of Patent: Nov. 24, 1998

[54] HANDTRUCK PARKING DEVICE FOR SECUREMENT ON A TRANSPORT VEHICLE

[75] Inventor: Lars Johansson, Kumla, Sweden

[73] Assignee: AB Volvo, Gothenburg, Sweden

[21] Appl. No.: 839,939

[22] Filed: Apr. 18, 1997

Related U.S. Application Data

[63] Continuation of Ser. No. 553,384, filed as PCT/SE94/00428, published as WO94/29142, Dec. 22, 1994, abandoned.

[30] Foreign Application Priority Data

Jun. 9, 1993 [SE] Sweden .................................. 9301973

[51] Int. Cl.$^6$ ..................................................... B60P 7/135
[52] U.S. Cl. ................................. 410/66; 410/30; 410/94; 188/32
[58] Field of Search .................................. 410/30, 49, 50, 410/36, 42, 46, 94, 66, 67, 37, 9, 19; 414/430, 563; 188/4 R, 32; 248/316.2, 352, 346.11, 188.1, 687; D12/217

[56] References Cited

U.S. PATENT DOCUMENTS

| | | | |
|---|---|---|---|
| 1,101,883 | 6/1914 | Rochford | 188/4 R |
| 2,465,551 | 3/1949 | Otterness. | |
| 2,470,054 | 5/1949 | Schildmeier | 414/430 |
| 2,850,117 | 9/1958 | Gersmehl, Sr. | D12/217 |
| 2,858,905 | 11/1958 | Fahland | 410/30 |
| 3,219,152 | 11/1965 | Castellani et al. | 410/66 |
| 3,391,760 | 7/1968 | Gonser. | |
| 3,833,138 | 9/1974 | Dean | 414/430 |
| 4,338,053 | 7/1982 | Abel | 410/94 |
| 4,653,967 | 3/1987 | Isaksson et al. | 410/49 |
| 4,993,990 | 2/1991 | Hamman | 410/30 X |

FOREIGN PATENT DOCUMENTS

| | | | |
|---|---|---|---|
| 450816 | 8/1948 | Canada | 188/4 R |
| 0 162 829 | 11/1985 | European Pat. Off.. | |
| 1250144 | 11/1960 | France | 188/32 |
| 2584664 | 1/1987 | France | 410/19 |
| 8402819 | 6/1987 | Sweden. | |
| 377282 | 6/1964 | Switzerland. | |
| 407 877 | 9/1966 | Switzerland. | |

*Primary Examiner*—Stephen T. Gordon
*Attorney, Agent, or Firm*—Finnegan, Henderson, Farrabow, Garrett & Dunner

[57] ABSTRACT

A parking device for parking a handtruck on the floor of a truck or like vehicle so as to prevent accidental movement of the handtruck on the floor during movement of the truck. The device includes a frame which is comprised of two frame parts, of which the first part is longer and thicker than the second part and is beveled on one side for facilitating movement of a handtruck onto the parking device. The first part extends at both of its ends beyond the second part which is joined generally at right angles to the first part inwardly from the ends of the first part. A cavity defined by the second part of the frame receives the wheels of the handtruck, whereas the upper surface of the first part supports the remainder of the handtruck and thus the general weight thereof.

6 Claims, 1 Drawing Sheet

HANDTRUCK PARKING DEVICE FOR SECUREMENT ON A TRANSPORT VEHICLE

This application is a continuation of application Ser. No. 08/553,384, filed as PCT/SE94/00428 May 9, 1994 published as WO94/29142 Dec. 22, 1994, now abandoned.

TECHNICAL FIELD OF THE INVENTION

The present invention relates to a handtruck parking device for use in the transportation of goods on the floor of a truck or lorry for instance, and functioning to prevent the handtruck from moving on the truck floor in an uncontrolled manner when the floor is not fully loaded.

BACKGROUND OF THE INVENTION

When transporting goods on pallets or the like on the floor of a truck, lorry or like vehicle, it is mostly necessary to carry a handtruck to enable the pallets to be moved around on the truck floor and to off-load the pallets or goods at a customer station, irrespective of whether or not the customer has a handtruck.

Hitherto, handtrucks have often been secured to a pallet or like device, wherewith all hydraulic devices on the handtruck are under pressure and there is a serious risk of oil leaking from the handtruck, which increases the danger of transport personnel slipping on the truck floor. Another way of attempting to prevent uncontrolled movement of a handtruck on the truck floor is to lay the handtruck on its side. In this case, however, the handtruck cannot be used immediately after it is lifted to a working position, because it takes time for the oil to return and for the hydraulic system to reach the state required for the handtruck to work satisfactorily, and consequently it is necessary to wait until the handtruck has regained its operative state and can be used. If no efforts are made to secure the handtruck, it will probably move around the truck floor and be damaged or damage the inside surfaces of the truck floor or the goods placed on the floor. A handtruck will normally weigh about 70 kilos and is liable to cause extensive damage, while its heavy weight constitutes a traffic hazard.

SE-B 8402819-0 teaches a device which prevents uncontrolled movement of transported wheeled devices. CH-A 377282 teaches a parking device similar to that disclosed in SE-B 8402819-0 which is placed on both sides of a wheel. These devices, however, are not suitable for parking a handtruck, since the wheels are wedged securely on both sides of a wheel. A handtruck has no space which will allow this solution to be used and the remainder of the truck cannot be unloaded. CH-A 407,877 teaches a wedge of synthetic material which is intended to be wedged firmly between a wheel and a supportive surface.

SUMMARY OF THE INVENTIVE CONCEPT

The purpose of the present invention is to avoid the aforementioned drawbacks associated with the transportation of goods on trucks, lorries or like transport vehicles where a handtruck is required to move or to off-load the goods because of their weight and/or because they are stacked on pallets.

A main object of the invention is to provide a device for parking a handtruck on the floor of a truck or like vehicle during transportation, this parking device relieving the handtruck hydraulics.

Another object of the invention is to provide a readily handled device for parking a handtruck on the floor of a truck or like vehicle during transportation.

A further object of the invention is to provide a device for parking a handtruck on the floor of a truck or like vehicle during transportation which is of simple and inexpensive manufacture.

Still another object of the invention is to provide a device for parking a handtruck on the floor of a truck or like vehicle during transportation which can be moved easily between different use positions.

Another object of the invention is to provide a device for parking a handtruck on the floor of a truck or like vehicle during transportation which is friendly to the spine and shoulders of the user and which can be used with very little effort.

Yet another object of the invention is to provide a device for parking a handtruck on the floor of a truck or like vehicle during transportation which will take-up only a small amount of space when not in use and which can be readily secured to the floor or to the sides surrounding the truck floor.

Another object of the invention is to provide a device for parking a handtruck on the floor of a truck or like vehicle during transportation which will enable the handtruck to be parked satisfactorily in the shortest possible time.

Still a further object of the invention is to provide a device for parking a handtruck on the floor of a lorry or like vehicle during transportation which can be used by persons who have only a temporary need for such a device.

Still another object of the invention is to provide a device for parking a handtruck on the floor of a truck or like vehicle during transportation which will not place the hydraulic system under more strain than is necessary, therewith reducing the extent to which the handtruck need be repaired in this respect, and which will prevent the handtruck from bumping into obstacles during transportation.

Still another object of the invention is to provide a device for parking a handtruck on the floor of a truck or like vehicle during transportation which will prevent the handtruck from moving accidentally on the floor and therewith cause damage to the goods or items placed on the floor.

These and other objects are achieved in accordance with the invention with a device defined in the introduction which includes a frame structure comprised of four mutually joined frame parts of which one part is longer and thicker than the remaining sides of the frame structure and wherein this side extends at both ends beyond the remainder of the frame structure, i.e. the parts extending generally at right angles to this part are joined to said part slightly inwards from the ends of said part, and wherein the frame cavity defined by said parts is intended to receive a handtruck wheel, whereas that part of the frame which is longer than the remaining parts is intended to receive the remainder of the handtruck and thus take-up essentially the full weight thereof.

To achieve the objects and in accordance with the purpose of the invention as embodied and broadly described herein, the handtruck parking device of this invention comprises a frame unit having a bottom support surface for resting on the floor of a transport vehicle, two frame parts including an elongated, first frame part, having a top support surface and first and second sides, a beveled surface formed on said first side and extending to the top support surface for facilitating movement of a handtruck onto the parking device; and a second frame part joined to the first frame part at the second side and enclosing a cavity for receiving at least one wheel of a handtruck, whereby the top support surface is designed to support the remaining part of a handtruck, the first frame part further having two ends extending outwardly of the joinder of the second frame part to the first frame part.

The invention will now be described in more detail with reference to the accompanying drawings, in which FIG. 1 is a top plan view of the inventive parking device; and FIG. 2 is a side view of the inventive parking device of FIG. 1.

DETAILED DESCRIPTION OF A PREFERRED EMBODIMENT OF THE INVENTION

Figure 1:
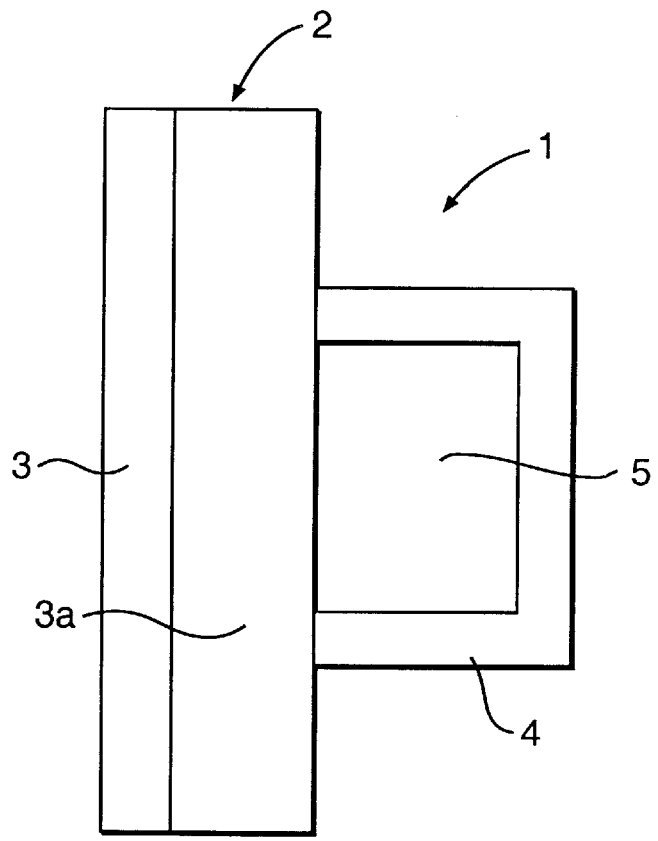
Figure 2:
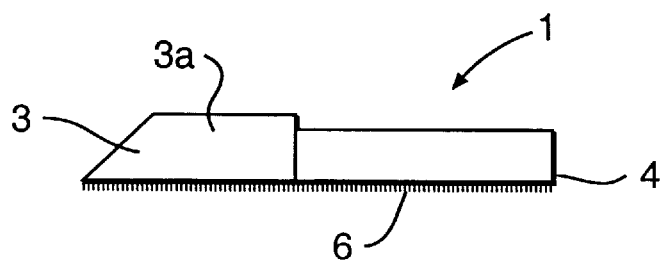

FIGS. 1 and 2 illustrate respectively a parking device 1 from above and taken from one side. The parking device 1 is comprised of two main parts, namely, a part 2 on which the wheels of the handtruck are moved up a beveled surface 3 and from there onto that part 3a of the main part 2 on which the weight of the handtruck will rest when the handtruck is parked, and a frame-like part 4 which defines a cavity 5 in which the wheels of the handtruck are placed when parking the handtruck. The bottom surface 6 of the device, i.e., the surface that rests on the truck floor, is made of a material that possesses a high coefficient of friction or is coated with a material that has a high coefficient of friction, or is provided with feet which are preferably serrated or have a high coefficient of friction. The device may be made of metal, plastic, rubber, wood or some other suitable material. The device may either be solid or comprised of metal plates or like elements welded together to form a box-like configuration.

The frame-like part 4 of the parking device 1 is preferably formed of three sides which enclose the cavity 5, the latter intended to receive at least one handtruck wheel, and preferably more than one wheel. The beveled surface 3 is formed on a first side of part 2 and extends downwardly and outwardly from the flat surface 3A toward the bottom surface to form the bevel. Preferably, the bevel defines an angle of about 45° with the underlying surface so as to facilitate movement of a handtruck onto the parking device. Two of the sides of part 4 are joined to and extend generally at right angles from the second side of part 2. As shown in FIG. 1, these two sides of part 4 are placed inwardly from the two ends of part 2, which is longer and thicker than part 4, so that the length of part 2 extends longitudinally beyond the two sides of part 4 connected thereto.

When using the parking device, the handtruck is positioned on the left of the device, as shown in FIG. 2. The handtruck is then drawn up onto the part 2 of the device, which preferably includes a bevelled surface 3, and then onto the flat surface 3a of the device 2 until the wheels of the handtruck are located in the cavity 5 defined by the frame-like part 4. In this position of the truck, most of the weight of the truck will rest on the flat part 3a of the part 2 and the wheels of the handtruck will be accommodated in the cavity 5. The handtruck thus rests on the flat surface 3a of the part 2 without strain on the hydraulic system. The truck is then secured to the parking device with the aid of a strap for instance, which is positioned on the truck. When wishing to use the handtruck, the strap is loosened from the truck and the handtruck is tipped towards the bevelled part 3 of the part 2 and pulled from the cavity 5 in the frame structure 4; hereafter the parking device may be hung on a hook (not shown) provided on a side wall of the truck floor.

It will be understood that the invention is not restricted to the exemplifying embodiment described and illustrated with reference to the accompanying drawing, and that modifications can be made within the Scope of the following Claims.

What is claimed is:

1. A parking device for parking a wheeled handtruck on the floor of a transport vehicle so as to prevent accidental movement of the handtruck on the floor during movement of the transport vehicle, said parking device comprising a frame unit having a bottom support surface for resting on said floor, two frame parts including an elongated, first frame part, having a top support surface and first and second sides, a beveled surface formed on said first side and extending to said top support surface for facilitating movement of a handtruck onto the parking device; and a second frame part joined to the first frame part at said second side and enclosing a cavity for receiving at least one wheel of a handtruck, whereby said top support surface is supporting the remaining main-wheel part of a handtruck, said first frame part further having two ends extending outwardly of the joinder of the second frame part to the first frame part.

2. A device according to claim 1, wherein the height of the top support surface is greater than the height of the second frame part.

3. A device according to claim 1, wherein the beveled surface extends along the entire first side of the first frame part.

4. A device according to claim 1, wherein said bottom support surface is of material having a high coefficient of friction.

5. A device according to claim 1, wherein said bottom support surface is provided with feet having a high coefficient of friction.

6. A device according to claim 1, wherein said second frame part has three sides, two of which are joined to said first frame part on its second side inwardly from the ends of said first frame part and extend generally perpendicularly out from the second side of said first frame part.

* * * * *

UNITED STATES PATENT AND TRADEMARK OFFICE
CERTIFICATE OF CORRECTION

PATENT NO. : 5,839,863

DATED : November 24, 1998

INVENTOR(S) : JOHANSSON, Lars

It is certified that error appears in the above-identified patent and that said Letters Patent is hereby corrected as shown below:

Claim 1, col. 4, line 29, after "is" insert -- for --;
line 30, change "main" to -- non --.

Signed and Sealed this

Thirtieth Day of March, 1999

Attest:

Attesting Officer

Q. TODD DICKINSON

Acting Commissioner of Patents and Trademarks